(12) United States Patent
Rische et al.

(10) Patent No.: US 7,220,814 B2
(45) Date of Patent: *May 22, 2007

(54) HYDROPHILICIZED BLOCKED POLYISOCYANATES

(75) Inventors: Thorsten Rische, Unna (DE); Christoph Gürtler, Köln (DE); Karin Naujoks, Odenthal (DE); Thomas Feller, Solingen (DE)

(73) Assignee: Bayer MaterialScience AG, Leverkusen (DE)

( * ) Notice: Subject to any disclaimer, the term of this patent is extended or adjusted under 35 U.S.C. 154(b) by 359 days.

This patent is subject to a terminal disclaimer.

(21) Appl. No.: 10/738,504

(22) Filed: Dec. 17, 2003

(65) Prior Publication Data

US 2004/0138403 A1 Jul. 15, 2004

(30) Foreign Application Priority Data

Dec. 20, 2002 (DE) ................................ 102 60 298

(51) Int. Cl.
*C09D 175/04* (2006.01)
*C08L 75/04* (2006.01)
*C08J 3/03* (2006.01)
*C08G 18/80* (2006.01)
*C09J 175/04* (2006.01)

(52) U.S. Cl. ................. 528/45; 252/182.2; 252/182.21; 252/182.22; 524/507; 524/591; 524/839; 524/840; 525/124; 525/440; 525/454; 525/455; 525/457; 525/528; 528/71; 560/24; 560/25; 560/26; 560/115; 560/157; 560/158; 564/123; 564/152; 564/159; 564/189; 564/191

(58) Field of Classification Search ............ 252/182.2, 252/182.21, 182.22; 524/591, 839, 840; 524/507; 528/45, 71; 560/24, 25, 26, 115, 560/157, 158; 564/123, 152, 159, 189, 191; 525/440, 454, 455, 457, 528, 124
See application file for complete search history.

(56) References Cited

U.S. PATENT DOCUMENTS

| | | | |
|---|---|---|---|
| 4,098,933 A | 7/1978 | Burkhardt et al. | 427/379 |
| 4,108,814 A | 8/1978 | Reiff et al. | 260/29.2 TN |
| 4,284,544 A | 8/1981 | Wegner et al. | 260/29.2 TN |
| 5,350,825 A | 9/1994 | König et al. | 528/45 |
| 6,025,433 A | 2/2000 | Shibatoh et al. | 524/590 |
| 6,060,573 A | 5/2000 | König et al. | 528/45 |
| 6,827,875 B2 * | 12/2004 | Schelhaas et al. | 252/182.2 |
| 6,843,933 B2 * | 1/2005 | Schelhaas et al. | 252/182.2 |
| 7,026,429 B2 * | 4/2006 | Gertzmann et al. | 528/45 |
| 7,057,003 B2 * | 6/2006 | Detig-Karlou et al. | 528/45 |
| 2003/0026999 A1 * | 2/2003 | Schelhaas et al. | 428/425.8 |

FOREIGN PATENT DOCUMENTS

| | | |
|---|---|---|
| EP | 0 916 647 | 5/1999 |
| WO | 95/35332 | 12/1995 |
| WO | 2408723 | 11/2002 |

OTHER PUBLICATIONS

J. Parkt. Chem., 336 (month unavailable) 1994, pp. 185-200, Hans Josef Laas et al, Zur Synthese aliphatischer Polyisocyanate-Lackpolyisocyanate mit Biuret-,Isocyanurat- oder Uretdionstruktur.
Progress in Organic Coatings, 9 (month unavailable) 1981, pp. 3-28, Zeno W. Wicks, Jr., "New Developments in the Field of Blocked Isocyanates".
Progress in Organic Coatings, 3, (month unavailable) 1975, pp. 73-99, Zeno W. Wicks Jr., "Blocked Isocyanates".
Houben Weyle, Methoden der organischen Chemie, XIV/2, (date unavailable), pp. 3-28 "Grundlagen des Polyadditionsverfahrens".
Progress in Organic Coatings 36, (month unavailable) 1999, pp. 148-172, Douglas A. Wicks et al, "Blocked isocyanates III: Part A. Mechanisms and chemistry".
Stabilization of Polymeric Materials (date unavailable), pp. 181-213.

* cited by examiner

*Primary Examiner*—Rabon Sergent
(74) *Attorney, Agent, or Firm*—Joseph C. Gil; Lyndanne M. Whalen

(57) ABSTRACT

The present invention relates to new hydrophilicized blocked polyisocyanates, a process for preparing them and their use.

12 Claims, No Drawings

HYDROPHILICIZED BLOCKED POLYISOCYANATES

CROSS REFERENCE TO RELATED PATENT APPLICATION

The present patent application claims the right of priority under 35 U.S.C. §119 (a)–(d) of German Patent Application No.102 602 98.0, filed Dec. 20, 2002.

FIELD OF THE INVENTION

The present invention relates to new hydrophilicized blocked polyisocyanates, a process for preparing them and their use.

BACKGROUND OF THE INVENTION

The blocking of polyisocyanates for temporarily protecting the isocyanate groups is a long-known operation and is described for example in Houben Weyl, Methoden der organischen Chemie XIV/2, pp. 61–70. Curable compositions comprising blocked polyisocyanates find use for example in polyurethane coating materials.

An overview of blocking agents suitable in principle is found for example in Wicks et al. in *Progress in Organic Coatings* 1975, 3, pp. 73–79, 1981, 9, pp. 3–28 and 1999, 36, pp. 148–172.

In aqueous coating compositions it is common to use hydrophilicized blocked polyisocyanates, whose preparation is described for example in DE-A 24 56 469 and DE-A 28 53 937.

A disadvantage when using prior art hydrophilicized blocked polyisocyanates is that after the deblocking and/or crosslinking a certain fraction of the blocking agent remains in the resultant coating film and adversely affects its quality.

Qualities such as scratch resistance and acid stability of one-component coating films are poorer because of the remanant blocking agent than those of two-component (2K) polyurethane coatings (e.g. T. Engbert, E. König, E. Jürgens, Farbe & Lack, Curt R. Vincentz Verlag, Hanover October 1995). The elimination of the blocking agent and its gaseous escape from the coating film can lead to blistering in the coating. Subsequent incineration of the emitted blocking agent may possibly be necessary from environmental and occupational hygiene standpoints.

In systems including the prior art hydrophilicized blocked polyisocyanates, the baking temperatures are typically from 150 to 170° C.

For aqueous 1K coating systems with lower baking temperatures of 90–120° C. polyisocyanates blocked predominantly with diethyl malonate have recently found use (e.g. EP-A 0 947 531). In contrast to blockings with, say, N-heterocyclic compounds, such as caprolactam or dimethylpyrazole, or else with butanone oxime, for example, the blocking agent in this case is not completely eliminated: instead there is a transesterification on the diethyl-malonate-blocked isocyanate with elimination of ethanol.

SUMMARY OF THE INVENTION

The present invention is directed to polyisocyanates that include at least one of i) or ii)
i) nonionically hydrophilicizing groups based on polyalkylene oxide polyethers containing at least 30% by weight ethylene oxide units.
ii) ionically or potentially ionically hydrophilicizing groups which on interaction with water enter into a pH-dependent dissociation equilibrium and are therefore neutral or positively or negatively charged depending on pH,
and
iii) at least one structural unit of the formula (1)

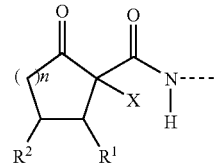

(1)

in which
X is an electron-withdrawing group,
$R^1$, $R^2$ independently of one another are a hydrogen atom, a saturated or unsaturated aliphatic or cycloaliphatic radical or an optionally substituted aromatic or araliphatic radical and each contain up to 12 carbon atoms and
n is an integer from 0 to 5.

The present invention is further directed to a process for preparing the above-described polyisocyanates including reacting
A) one or more organic polyisocyanates together with
B) one or more organic compounds having at least one isocyanate-reactive group which have
b1) nonionically hydrophilizing groups based on polyalkylene oxide polyethers containing at least 30% by weight ethylene oxide units, and/or
b2) ionically or potentially ionically hydrophilizing groups which on interaction with water enter into a pH-dependent dissociation equilibrium and are therefore neutral or positively or negatively charged depending on pH,
C) one or more blocking agents comprising at least one CH-acidic cyclic ketone of the general formula (2),

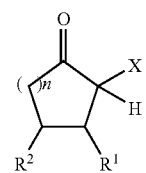

(2)

where X, $R^1$, $R^2$ and n are as defined above, and
D) optionally one or more (cyclo)aliphatic monoamines and/or polyamines having 1 to 4 amino groups of the molecular weight range up to 400, and optionally one or more polyhydric alcohols having 1 to 4 hydroxyl groups of the molecular weight range up to 400, optionally also amino alcohols,
in the presence of
E) one or more catalysts,
F) optionally, auxiliaries and additives and
G) optionally, solvents.

The present invention is also directed to a method for producing coating materials, coatings, sizes, adhesives and mouldings including adding the above-described polyisocyanate to a composition comprising a film-forming resin.

The present invention is additionally directed to coating compositions that include
a) one or more of the above-described polyisocyanates,
b) one or more film-forming resins,
c) optionally, catalysts,
d) optionally, solvents and
e) optionally, auxiliaries and additives.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

It has now been found that the blocking of hydrophilicized polyisocyanates with CH-acidic cyclic ketones leads to products which react without elimination of the blocking agent, i.e., in a way which is free from emissions, and which possess crosslinking temperatures below 150° C. Additionally these hydrophilicized blocked polyisocyanates can be combined with other aqueous binders.

The invention provides polyisocyanates which have
i) nonionically hydrophilizing groups based on polyalkylene oxide polyethers containing at least 30% by weight ethylene oxide units and/or
ii) ionically or potentially ionically hydrophilizing groups which on interaction with water enter into a pH-dependent dissociation equilibrium and are therefore neutral or positively or negatively charged depending on pH,
and
iii) at least one structural unit of the formula (1)

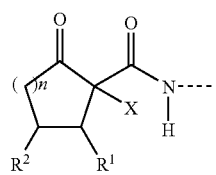

(1)

in which
X is an electron-withdrawing group,
R¹, R² independently of one another are a hydrogen atom, a saturated or unsaturated aliphatic or cycloaliphatic radical or an optionally substituted aromatic or araliphatic radical and each contain up to 12 carbon atoms and
n is an integer from 0 to 5.

The invention further provides a process for preparing the polyisocyanates of the invention, wherein
A) one or more organic polyisocyanates are reacted together with
B) one or more organic compounds having at least one isocyanate-reactive group which have
    b1) nonionically hydrophilicizing groups based on polyalkylene oxide polyethers containing at least 30% by weight ethylene oxide units, and/or
    b2) ionically or potentially ionically hydrophilizing groups which on interaction with water enter into a pH-dependent dissociation equilibrium and are therefore neutral or positively or negatively charged depending on pH, C) one or more blocking agents comprising at least one CH-acidic cyclic ketone of the general formula (2),

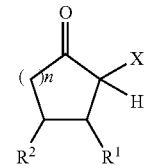

(2)

in which
X is an electron-withdrawing group,
R¹, R² independently of one another are a hydrogen atom, a saturated or unsaturated aliphatic or cycloaliphatic radical or an optionally substituted aromatic or araliphatic radical and each contain up to 12 carbon atoms and
n is an integer from 0 to 5,
and
D) optionally one or more (cyclo)aliphatic monoamines and/or polyamines having 1 to 4 amino groups of the molecular weight range up to 400, and optionally one or more polyhydric alcohols having 1 to 4 hydroxyl groups of the molecular weight range up to 400, optionally also amino alcohols,
in the presence of
E) one or more catalysts,
F) optionally, auxiliaries and additives and
G) optionally, solvents.

To prepare the polyisocyanates of the invention it is possible as component A) to use all organic compounds containing isocyanate groups, preferably aliphatic, cycloaliphatic, aromatic or heterocyclic polyisocyanates with an NCO functionality ≧2, individually or in any desired mixtures with one another.

Preferably the compounds of component A) have an average NCO functionality of from 2.0 to 5.0, more preferably from 2.3 to 4.5, an isocyanate group content of from 5.0 to 27.0% by weight, more preferably from 14.0 to 24.0% by weight, and preferably a monomeric diisocyanate content of less than 1% by weight, more preferably less than 0.5% by weight.

Suitable diisocyanates for preparing the compounds of component A) are diisocyanates and triisocyanates of the molecular weight range from 140 to −400 which are accessible by phosgenation or by phosgene-free processes, for example by thermal urethane cleavage, and which have aliphatically, cycloaliphatically, araliphatically and/or aromatically attached isocyanate groups, such as 1,4-diisocyanatobutane, 1,5-diisocyanatopentane, 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane, 1,10-diisocyanatodecane, 1,3- and 1,4-diisocyanatocyclohexane, 1,3- and 1,4-bis-(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane (Desmodur® W, Bayer AG, Leverkusen), 4-isocyanatomethyloctane 1,8-diisocyanate (triisocyanatononane, TIN), ω,ω'-diisocyanato-1,3-dimethylcyclohexane (H₆XDI), 1-isocyanato-1-methyl-3-isocyanatomethylcyclohexane, 1-isocyanato-1-methyl-4-isocyanatomethylcyclohexane, bis-(isocyanatomethyl)norbornane, 1,5-naphthalene diisocyanate, 1,3- and 1,4-bis- (2-isocyanatoprop-2-yl)benzene (TMXDI), 2,4- and 2,6-diisocyanatotoluene (TDI) especially the 2,4 and the 2,6 isomer and technical-grade mixtures of the two isomers, 2,4'- and 4,4'-diisocyanatodiphenylmethane (MDI), 1,5-diisocyanatonaphthalene, 1,3-bis(isocyanatomethyl)benzene (XDI) and any desired mixtures of the said compounds.

Highly suitable compounds of component A) are polyisocyanates obtainable by reacting the di- or triisocyanates with themselves by way of isocyanate groups, such as uretdiones or carbodiimide compounds, or such as isocyanurates or iminooxadiazinediones, which are formed by reaction of three isocyanate groups.

The polyisocyanates may likewise contain monomeric di- and/or triisocyanates and/or oligomeric polyisocyanates having biuret, allophanate and acylurea structural elements, low-monomer-content or proportionally modified monomeric di-, triisocyanates, and any desired mixtures of the said polyisocyanates. Likewise highly suitable are polyisocyanate prepolymers containing on average more than one isocyanate group per molecule. They are obtained by first reacting a molar excess of one of the abovementioned polyisocyanates, for example, with an organic material containing at least two active hydrogen atoms per molecule, in the form of hydroxy groups, for example.

Particularly preferred polyisocyanates of component A) are those containing a uretdione, isocyanurate, acylurea, biuret, allophanate or iminooxadiazinedione and/or oxadiazinetrione structure (cf. also J. Prakt. Chem. 336 (1994) page 185–200) and based on aforesaid diisocyanates, particularly on the aliphatic and/or cycloaliphatic diisocyanates.

Very particular preference is given to using in component A) polyisocyanates or polyisocyanate mixtures of the stated kind having exclusively aliphatically and/or cycloaliphatically attached isocyanate groups, based in particular on hexamethylene diisocyanate (HDI), isophorone diisocyanate (IPDI) and/or 4,4'-diisocyanatodi-cyclohexylmethane.

Suitable compounds of component B) are non-ionically (type b1)) and/or ionically or potentially ionically (type b2)) hydrophilizing compounds having isocyanate-reactive groups, which can be used individually or in any desired mixtures with one another.

Nonionically hydrophilizing compounds b1) are for example monofunctional polyalkylene oxide polyether alcohols having on average from 5 to 70, preferably from 7 to 55, ethylene oxide units per molecule and containing at least 30% by weight ethylene oxide units, as are obtainable in a manner known per se by alkoxylating suitable starter molecules (e.g. in Ullmanns Encyclopädie der technischen Chemie, 4th edition, volume 19, Verlag Chemie, Weinheim pp. 31–38).

Suitable starter molecules are for example saturated monoalcohols such as methanol, ethanol, n-propanol, iso-propanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxymethylcyclohexane, 3-ethyl-3-hydroxymethyloxetane, or tetrahydrofurfuryl alcohol; diethylene glycol monoalkyl ethers such as diethylene glycol monobutyl ether; for example; unsaturated alcohols such as allyl alcohol, 1,1-dimethylallyl alcohol or oleyl alcohol, aromatic alcohols such as phenol, the isomeric cresols or methoxyphenols, aralipatic alcohols such as benzyl alcohol, anisyl alcohol or cinnamyl alcohol; secondary monoamines such as dimethylamine, diethylamine, dipropylamine, diisopropylamine, dibutylamine, bis-(2-ethylhexyl)amine, N-methyl- and N-ethylcyclohexylamine or dicyclohexylamine, and heterocyclic secondary amines such as morpholine, pyrrolidine, piperidine or 1H-pyrazole.

Preferred starter molecules are saturated monoalcohols and also diethylene glycol monoalkyl ethers. Particular preference is given to using diethylene glycol monobutyl ether as starter molecule.

Alkylene oxides suitable for the alkoxylation reaction are especially ethylene oxide and propylene oxide, which can be used in either order or else in a mixture in the alkoxylation reaction.

The polyalkylene oxide polyether alcohols are preferably pure polyethylene oxide polyethers or mixed polyalkylene oxide polyethers at least 30 mol %, preferably at least 40 mol % of whose alkylene oxide units are composed of ethylene oxide units.

Particularly preferred nonionically hydrophilizing compounds b1) are mono-functional mixed polyalkylene oxide polyethers containing at least 40 mol % ethylene oxide and not more than 60 mol % propylene oxide units.

By ionically or potentially ionically hydrophilicizing compounds b2) of component B) are meant all compounds which have at least one isocyanate-reactive group and also at least one functionality, such as —COOY, —$SO_3$Y, —PO$(OY)_2$ (Y=H, $NH_4^+$, metal cation), —$NR_2$, —$NR_3^+$ (R=H, alkyl, aryl), for example, which on interaction with aqueous media enters into an optionally pH-dependent dissociation equilibrium and in this way can be negatively, positively or neutrally charged.

These compounds are preferably mono- or dihydroxy-functional carboxylic, sulphonic or phosphonic acids, mono- or diamino-functional carboxylic, sulphonic or phosphonic acids, which can be present in the form of internal salts (zwitterions, betaines, ylides) or as metal salts or ammonium salts. Examples of the said ionically or potentially ionically hydrophilicizing compounds are dimethylolpropionic acid, hydroxypivalic acid, N-(2-aminoethyl)-β-alanine, 2-(2-aminoethylamino)ethane-sulphonic acid, ethylenediamine-propyl- or butyl-sulphonic acid, 1,2- or 1,3-propylenediamin-β-ethylsulphonic acid, lysine, 3,5-diaminobenzoic acid, the hydrophilizing agent according to Example 1 from EP-A 0 916 647 and the alkali metal salts and/or ammonium salts thereof; the adduct of sodium bisulphite with but-2-ene-1,4-diol, polyethersulphonate, the propoxylated adduct of 2-butenediol and $NaHSO_3$ (e.g. in DE-A 2 446 440, page 5–9, formula I-III) and also compounds containing building blocks which can be converted into cationic groups, e.g. amine-based building blocks, such as N-methyldiethanolamine, as hydrophilic structural components. Furthermore as component b2) in component B) it is also possible to use CAPS (cyclohexylaminopropanesulphonic acid) as for example in WO 01/88006.

Particularly preferred ionically or potentially ionically hydrophilicizing compounds for use in component b2) are N-(2-aminoethyl)-β-alanine, 2-(2-aminoethylamino)-ethanesulphonic acid, dimethylolpropionic acid, the hydrophilicizing agent according to Example 1 of EP-A 0 916 647, and the metal salts or ammonium salts thereof.

Component B) is preferably a combination of nonionically and ionically or potentially ionically hydrophilizing compounds of the said kind, particularly combinations of non-ionically and anionically hydrophilicizing compounds.

Blocking agents used in component C) are CH-acidic cyclic ketones of the general formula (2)

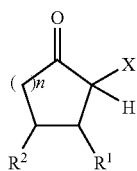
(2)

in which

X is an electron-withdrawing group,

R¹, R² independently of one another can be a hydrogen atom, a saturated or unsaturated aliphatic or cycloaliphatic radical or an optionally substituted aromatic or araliphatic radical and each contain up to 12 carbon atoms and n is an integer from 0 to 5.

The electron-withdrawing group X may be any substituent which as a result, for example, of mesomeric and/or inductive effects results in CH acidity of the α hydrogen. Such substituents can be, for example, ester groups, sulphoxide groups, sulphone groups, nitro groups, phosphonate groups, nitrile groups, isonitrile groups or carbonyl groups. Preference is given to nitrile groups and ester groups, particularly preference to carboxymethyl ester and carboxyethyl ester groups.

Also suitable are compounds of the general formula (2) with a ring optionally containing heteroatoms, such as oxygen, sulphur, or nitrogen atoms. Preference is given in this context to the structural motif of a lactone.

Preferably the activated cyclic system of the formula (2) has a ring size of 5 (n=1) and 6 (n=2).

Preferred compounds of the general formula (2) are cyclopentanone-2-carboxymethyl ester and -carboxyethyl ester, cyclopentanone-2-carbonitrile, cyclohexanone-2-carboxymethyl ester and -carboxyethyl ester or cyclopentanone-2-carbonylmethane. Particular preference is given to cyclopentanone-2-carboxymethyl ester and -carboxyethyl ester and to cyclohexanone-2-carboxymethyl ester and -carboxyethyl ester.

It will be appreciated that in component C) the stated CH-acidic cyclic ketones can be used both in mixtures with one another and in any desired mixtures with other blocking agents. Examples of suitable further blocking agents include alcohols, lactams, oximes, malonates, alkyl acetoacetates, triazoles, phenols, imidazoles, pyrazoles, and amines, such as, for example, butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-methyl-, N-ethyl-, N-(iso)propyl-, N-n-butyl-, N-iso-butyl-, N-tert-butyl-benzylamine or 1,1-dimethylbenzylamine, N-alkyl-N-1,1-dimethylmethylphenylamine, adducts of benzylamine with compounds having activated double bonds such as malonates, N,N-dimethylaminopropylbenzylamine and other optionally substituted benzylamines containing tertiary amino groups and/or dibenzylamine or any desired mixtures of these blocking agents. If used at all the fraction of these further blocking agents of component C) other than CH-acidic cyclic ketones is up to 80% by weight, preferably up to 60% by weight, more preferably up to 20% by weight of the overall component C).

Very particular preference is given to using exclusively cyclopentanone-2-carboxyethyl ester as component C).

At least 50% by weight, preferably at least 60% by weight and, with particular preference, at least 70% by weight of the isocyanate groups of polyisocyanates of the invention are in a form in which they are blocked with compounds of component C).

As component D) it is possible to use further isocyanate-reactive mono-, di-, tri-, and/or tetra-functional components individually or in any desired mixtures with one another. These can be mono-, di-, tri-, and/or tetra-amino- or hydroxy-functional substances having a molecular weight up to 400 g/mol such as, for example, ethylenediamine, 1,2- and 1,3-diaminopropane, 1,3-, 1,4- and 1,6-diaminohexane, 1,3-diamino-2,2-dimethylpropane, 1-amino-3,3,5-trimethyl-5-aminoethylcyclo-hexane (IPDA), 4,4'-diaminodicyclo-hexylmethane, 2,4- and 2,6-diamino-1-methyl-cyclohexane, 4,4'-diamino-3,3'-dimethyldicyclohexylmethane, 1,4-bis-(2-amino-prop-2-yl)cyclohexane, ethylene glycol, propylene glycol, 1,4-butanediol, 1,6-hexanediols, glycerol, trimethylolethane, trimethylolpropane, the isomeric hexanetriols, pentaerythritol or any desired mixtures of these compounds.

As compounds of component E) it is possible to use all compounds known to the person skilled in the art for the catalysis of NCO blocking, individually or in any desired mixtures. Preferably alkali metal bases and alkaline earth metal bases, such as powdered sodium carbonate (soda) or trisodium phosphate, the metal salts especially carbonates of the second transition group, in particular of zinc, and also tertiary amines such as DABCO (1,4-diazabicyclo[2.2.2] octane) are suitable.

With preference as compounds in components E) sodium carbonate, potassium carbonate or zinc salts especially zinc 2-ethylhexanonate are used.

As component F) for optional use it is possible for auxiliaries and additives or mixtures thereof to be present. Suitable compounds in the sense of F) are for example antioxidants such as 2,6-ditert-butyl-4-methylphenol, UV absorbers of the 2-hydroxyphenylbenzotriazole type or light stabilizers of the HALS compound type or other commercially customary stabilizers as described for example in "Lichtschutzmittel für Lacke" (A. Valet, Vincentz Verlag, Hanover, 1996) and "Stabilization of Polymeric Materials" (H. Zweifel, Springer Verlag, Berlin, 1997, Appendix 3, pp. 181–213).

Suitable organic solvents G) are the customary paint solvents, such as ethyl acetate, butyl acetate, 1-methoxy-2-propyl acetate, 3-methoxy-n-butyl acetate, acetone, 2-butanone, 4-methyl-2-pentanone, cyclohexanone, toluene, xylene, chlorobenzene or white spirit, for example. Mixtures containing aromatics with a relatively high degree of substitution in particular, such as are on the market for example under the names Solvent Naphtha, Solvesso® (Exxon Chemicals, Houston, USA), Cypar® (Shell Chemicals, Eschborn, DE), Cyclo Sol® (Shell Chemicals, Eschborn, DE), Tolu Sol® (Shell Chemicals, Eschborn, DE), Shellsol® (Shell Chemicals, Eschborn, DE), are likewise suitable. Further solvents are for example carbonates, such as dimethyl carbonate, diethyl carbonate, 1,2-ethylene carbonate and 1,2-propylene carbonate, lactones, such as β-propiolactone, γ-butyrolactone, ε-caprolactone, ε-methylcaprolactone, propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents. Preferred solvents are acetone, 2-butanone, 1-methoxy-2-propyl acetate, xylene, toluene, mixtures containing primarily aromatics with a relatively high degree of substitution, as on the market for example under the names Solvent Naphtha, Solvesso® (Exxon Chemicals, Houston, USA), Cypar® (Shell Chemicals, Eschborn, DE), Cyclo Sol® (Shell Chemicals, Eschborn, DE), Tolu Sol® (Shell Chemicals, Eschborn, DE), Shellsol® (Shell Chemicals, Eschborn, DE), and N-methylpyrrolidone. Particular preference is given to acetone, 2-butanone and N-methylpyrrolidone.

The process of the invention is conducted preferably at temperatures from 15° C. to 140° C., more preferably 40 to 90° C.

In the process of the invention components A), B), C) and optionally D) are reacted with one another in the presence of a catalyst E) in any order optionally in the presence of components F) and optionally in a solvent G).

In one preferred embodiment of the invention B) comprises not only non-ionically (in accordance with b1)) but also ionically or potentially ionically (in accordance with (b2)) hydrophilicizing compounds and the preparation of polyisocyanates of the invention is carried out such that A) is admixed first with the compounds of the type b1) and also, where appropriate, with components D), F) and G). Thereafter the reaction mixture is reacted with the blocking agent C) in the presence of the catalyst E) followed by the compounds of the type b2). In another preferred embodiment of the invention B) comprises compounds according to b 1) and b2), the latter having at least one hydroxyl group as isocyanate-reactive group and being free from amino functions. In this case the preparation of the polyisocyanates of the invention is conducted such that A) is admixed with the hydrophilicizing compounds b1) and b2) and also, where appropriate, with components D), F) and G). Thereafter the reaction mixture is reacted with the blocking agent C) in the presence of the catalyst E).

Preferably in the process of the invention from 40 to 80% by weight of component A), from 1 to 40% by weight of component B), from 15 to 60% by weight of component C), and from 0 to 30% by weight of component D) are used, the sum of A to D) adding up to 100% by weight.

With particular preference in the process of the invention from 45 to 75% by weight of component. A), from 1 to 35% by weight of component B), from 20 to 50% by weight of component C), and from 0 to 20% by weight of component D) are used, the sum of A to D) adding up to 100% by weight.

With very particular preference in the process of the invention from 50 to 70% by weight of component A), from 3 to 30% by weight of component B), from 25 to 45% by weight of component C), and from 0 to 10% by weight of component D) are used, the sum of A to D) adding up to 100% by weight.

The hydrophilicized blocked polyisocyanates can optionally comprise stabilizers and other auxiliaries E) and also, if desired, organic solvents F). Based on the reaction products of A) to D) the stabilizers and/or auxiliaries E) are used in amounts of 0–25% by weight, preferably of 0–15% by weight, with particular preference of 0–5% by weight and the organic solvents F) are used in amounts of 0–30% by weight, preferably of 0–20% by weight, with particular preference of 0–10% by weight.

With particular preference no solvent G) is used.

The polyisocyanates of the invention can be used for example for producing coating materials, coatings, sizes, adhesives and mouldings.

The invention further provides aqueous solutions or dispersions of the polyisocyanates of the invention and also provides a process for the preparation wherein the hydrophilic isocyanates of the invention are mixed with water or hydrous solvents.

The aqueous systems of the blocked polyisocyanates have a solids content of between 10 to 70% by weight, preferably from 20 to 60% by weight and with particular preference from 25 to 50% by weight and the fraction of any organic solvents G) present is less than 15% by weight, preferably less than 10% by weight, in particular less than 5% by weight. Any organic solvent G) present may be separated off for example by distillation.

The invention finally provides coating compositions comprising
  a) one or more polyisocyanates of the invention,
  b) one or more film-forming resins
  c) optionally, catalysts
  d) optionally, solvents, water
  e) optionally, auxiliaries and additives and provides a process for preparing them, wherein components a) to e) are mixed with one another in any order.

Suitable film-forming resins b) are functionalized polymers which are in dispersion or soluble, emulsifiable or dispersible in water. Examples are polyester polymers or polyester polymers containing epoxide groups, polyurethanes, acrylic polymers, vinyl polymers such as polyvinyl acetate, polyurethane dispersions, polyacrylate dispersions, polyurethane-polyacrylate hybrid dispersions, polyvinyl ether or polyvinyl ester dispersions, polystyrene or polyacrylonitrile dispersions, which can be used both in mixtures and also in combination with further blocked polyiso-cyanates and amino crosslinker resins such as melamine resins for example. The solids content of the film-forming resins is preferably from 10 to 100% by weight, more preferably from 30 to 100% by weight.

The film-forming resins b) may possess NCO-reactive groups such as carboxylic acid groups or alcohol groups for example and hence can crosslink in combination with the polyisocyanates of the invention. If the film-forming resins do not possess any NCO-reactive groups then it is possible that the binder or the size or the coating composition reacts with the substrate to which it has been applied.

Suitable catalysts c) for the crosslinking are all catalysts known to the person skilled in the art for the isocyanate addition reaction, such as dibutyltin dilaurate (DBTL), triethylamine 1,4-dazabicyclo-[2.2.2]octane, tin dioctoate or dibutyltin dilaurate. Preference is given to dibutyltin dilaurate.

These catalysts c) are employed generally in amounts from 0 to 5% by weight, preferably from 0.05 to 2% by weight, in particular 0.1 to 1.5% by weight based on the total amount of the coating composition.

The invention further provides coatings obtainable from the coating compositions of the invention.

The coating compositions of the invention can be applied to substrates by any desired methods, such as dipping, spraying, rolling or squirting for example.

Examples of suitable substrates for coating are metals, woods, glass, glass fibres, carbon fibres, stone, ceramic minerals, concrete, plastics of all kinds, textiles, leather, paper, hard fibres, straw or bitumen, a primer being applied optionally prior to coating with the coating compositions of the invention. Preferred substrates are plastics, glass fibres, carbon fibres, metals, textiles and leather.

The coating compositions of the invention are cured preferably in baking times of from 15 to 30 minutes and at temperatures of from 100 to 200° C., preferably from 110 to 180° C. The baking times are dependent in particular on the amount of catalyst employed. Preference is given to baking over a period of 30 minutes at a temperature of 110–140° C.

EXAMPLES

In the examples below all percentages are by weight (% by weight).

The NCO content was determined by titration in accordance with DIN EN ISO 11909 (titration with dibutylamine).

Example 1

21.9 g of a monofunctional polyether prepared starting from n-butanol and based on ethylene oxide/propylene oxide (approximately 85:15), with an average molar weight of 2 250 (OHN=25) (Polyether LB 25, Bayer AG, Leverkusen, DE), 125.5 g of a polyisocyanate based on 1,6-diisocyanatohexane (HDI) and containing isocyanurate groups, with an NCO content of 21.8% (HDI polyisocyanate with isocyanurate structure, viscosity 3 200 mPas, Desmodur® N3300, Bayer AG, Leverkusen), and 0.25 g of zinc ethylhexanoate were charged to a vessel and heated with stirring to 50° C. Thereafter 75.8 g of cyclopentanone-2-carboxyethyl ester were added over the course of 30 min. Following the addition the mixture was stirred at 50° C. for 20 min, 7.0 g of a hydrazine adduct of 1 mol of hydrazine hydrate and 2 mol of propylene carbonate, of molecular weight 236, were metered in and stirring was continued until the theoretical NCO value is reached. Thereafter a solution of 17.4 g of AAS solution (Bayer AG, DE, Leverkusen, 45% strength aqueous solution of the sodium salt of 2-(2-aminoethylamino)ethane sulphonic acid, Bayer AG, Leverkusen, DE) and 121.9 g of water was metered in over the course of 10 min and the reaction mixture was stirred for 5 min more. Dispersing was carried out by adding 420.8 g of water (T=6⁰° C.) in 10 min. The subsequent stirring time was 2 h. A dispersion was obtained with a solids content of 30.0%.

Example 2

21.9 g of a monofunctional polyether prepared starting from n-butanol and based on ethylene oxide/propylene oxide (approximately 85:15), with an average molar weight of 2 250 (OHN=25) (Polyether LB 25, Bayer AG, Leverkusen, DE), 125.5 g of a polyisocyanate based on 1,6-diisocyanatohexane (HDI) and containing isocyanurate groups, with an NCO content of 21.8% (HDI polyisocyanate with isocyanurate structure, viscosity 3 200 mPas, Desmodur® N3300, Bayer AG, Leverkusen), and 0.15 g of zinc ethylhexanoate were charged to a vessel and heated with stirring to 50° C. Thereafter 75.8 g of cyclopentanone-2-carboxyethyl ester were added over the course of 30 min. Following the addition the mixture was stirred at 50° C. for 20 min, 7.0 g of a hydrazine adduct of 1 mol of hydrazine hydrate and 2 mol of propylene carbonate, of molecular weight 236, were metered in and stirring was continued until the theoretical NCO value is reached. Thereafter a solution of 18.3 g of AAS solution (Bayer AG, DE, Leverkusen, 45% strength aqueous solution of the sodium salt of 2-(2-aminoethylamino)ethane sulphonic acid, Bayer AG, Leverkusen, DE) and 146.0 g of water was metered in over the course of 10 min and the reaction mixture was stirred for 5 min more. Dispersing was carried out by adding 400.0 g of water (T=60° C.) in 10 min. The subsequent stirring time was 2 h. A dispersion was obtained with a solids content of 30.0%.

Example 3

21.3 g of a monofunctional polyether prepared starting from n-butanol and based on ethylene oxide/propylene oxide (approximately 85:15), with an average molar weight of 2 250 (OHN=25) (Polyether LB 25, Bayer AG, Leverkusen, DE), 121.6 g of a polyisocyanate based on 1,6-diisocyanatohexane (HDI) and containing isocyanurate groups, with an NCO content of 21.8% (HDI polyisocyanate with isocyanurate structure, viscosity. 3 200 mPas, Desmodur® N3300, Bayer AG, Leverkusen), and 0.12 g of zinc ethylhexanoate were charged to a vessel and heated with stirring to 50° C. Thereafter 73.4 g of cyclopentanone-2-carboxyethyl ester were added over the course of 30 min. Following the addition the mixture was stirred at 50° C. for 20 min, 7.0 g of a hydrazine adduct of 1 mol of hydrazine hydrate and 2 mol of propylene carbonate, of molecular weight 236, were metered in and stirring was continued until the theoretical NCO value was reached. Thereafter a solution of 15.5 g of the hydrophilicizing agent KV 1386 (40% strength aqueous solution of the sodium salt of N-(2-aminoethyl)-β-alanine, BASF AG, Ludwigshafen, DE) and 108.4 g of water was metered in over the course of 10 min and the reaction mixture was stirred for 5 min more. Dispersing was carried out by adding 417.2 g of water (T=60° C.) in 10 min. The subsequent stirring time was 2 h. A dispersion was obtained with a solids content of 30.0%.

Example 4

23.6 g of a monofunctional polyether prepared starting from n-butanol and based on ethylene oxide/propylene oxide (approximately 85:15), with an average molar weight of 2 250 (OHN=25) (Polyether LB 25, Bayer AG, Leverkusen, DE), 18.9 g of polyethersulphonate (OHN=263, polypropylene oxide diol, average molar weight: 426 g/mol, Bayer AG, DE)), 135.1 g of a polyisocyanate based on 1,6-diisocyanatohexane (HDI) and containing isocyanurate groups, with an NCO content of 21.8% (HDI polyisocyanate with isocyanurate structure, viscosity 0.3 200 mPas, Desmodur® N3300, Bayer AG, Leverkusen), and 0.28 g of zinc ethyl-hexanoate were charged to a vessel and heated with stirring to 50° C.

Thereafter 81.6 g of cyclopentanone-2-carboxyethyl ester were added over the course of 30 min. Following the addition the mixture was stirred at 50° C. for 20 min, 7.5 g of a hydrazine adduct of 1 mol of hydrazine hydrate and 2 mol of propylene carbonate, of molecular weight 236, were metered in and stirring was continued until the theoretical NCO value is reached. Dispersing was carried out by adding 622.4 g of water (T=60° C.) in 10 min. The subsequent stirring time was 2 h. A dispersion was obtained with a solids content of 29.9%.

Example 5

25.3 g of a monofunctional polyether prepared starting from n-butanol and based on ethylene oxide/propylene oxide (approximately 85:15), with an average molar weight of 2 250 (OHN=25) (Polyether LB 25, Bayer AG, Leverkusen, DE), 6.4 g of dimethylolpropionic acid, 144.8 g of a polyisocyanate based on 1,6-diisocyanatohexane (HDI) and containing isocyanurate groups, with an NCO content of 21.8% (HDI polyisocyanate with isocyanurate structure, viscosity 3 200 mPas, Desmodur® N3300, Bayer AG, Leverkusen), and 0.29 g of zinc ethylhexanoate were charged to a vessel and heated with stirring to 50° C. Thereafter 87.4 g of cyclopentanone-2-carboxyethyl ester were added over the course of 30 min. Following the addition the mixture was stirred at 50° C. for 20 min, 8.1 g of a hydrazine adduct of 1 mol of hydrazine hydrate and 2 mol of propylene carbonate, of molecular weight 236, were metered in and stirring was continued until the theoretical NCO value is reached. Thereafter 4.6 g of triethylamine were added and stirring was continued at 50° C. for 10 min. Dispersing was carried out by adding 634.4 g of water (T=60° C.) in 10 min. The subsequent stirring time was 2 h. A dispersion was obtained with a solids content of 30.0%.

Example 6

67.7 g (0.35 eq) of a polyisocyanate based on 1,6-diisocyanatohexane (HDI) having an NCO content of 21.8% (HDI polyisocyanate with isocyanurate structure, viscosity 3 200 mPas, Desmodur® N3300, Bayer AG, Leverkusen) together with 34 mg of zinc 2-ethylhexanoate (Octa-Soligen® Zink, Borchers GmbH, Monheim, DE) were charged to a 250 mL three-necked flask with mechanical stirring and dissolved in 20.5 g (to 80% solids) of methoxypropyl acetate. Added carefully to this solution dropwise were 40.5 g (0.259 eq) of cyclopentanone-2-carboxyethyl ester, the addition taking place with stirring and at a rate such that the reaction temperature did not rise above 40° C. After the desired NCO value (2.97%) had been reached 20.1 g (0.091 eq) of CAPS (cyclohexylaminopropanesulphonic acid, Raschig, DE) (and. 11.6 g (0.091 eq) of dimethylcyclohexylamine were added and the mixture was stirred at 80° C. until a clear solution was obtained. Prior to dispersing, the system was adjusted With methoxypropyl acetate to a solids conterit of 70%. The hydrophilicized polyisocyanate obtained in this way can be dispersed in water to give a stable 40% dispersion.

The determination of the mechanical properties of the hydrophilicized blocked polyisocyanates of the invention is made on free films. The free films are produced by blending the hydrophilicized blocked polyisocyanates in combination with a film-forming resin. The mixtures stated were prepared from 60% by weight Baybond® PU 401 (anionic-nonionic PU dispersion having a solids content of 40% and an average particle size of 100–300 nm, Bayer AG, DE (film-forming resin)) and 40% by weight of a hydrophilized blocked polyisocyanate of the invention.

The free films were produced from these mixtures as follows: a film applicator consisting of two polished rolls which can be set an exact distance apart had a release paper inserted into it ahead of the back roll. The distance between the paper and the front roll was adjusted using a feeler gauge. This distance corresponded to the film thickness (wet) of the resultant coating, and could be adjusted for the desired add-on of each coat. Coating consecutively in a plurality of coats was also possible. To apply the individual coats the products (aqueous formulations were set to a viscosity of 4 500 mPa·s beforehand by adding ammonia/polyacrylic acid) were poured onto the nip between the paper and the front roll and the release paper was pulled away vertically downwards, forming the corresponding film on the paper. Where two or more coats were to be applied, each individual coat was dried and the paper inserted anew.

The 100% modulus was determined in accordance with DIN 53504 on films >100 μm thick.

The average particle sizes (the figure stated is the numerical average) of the PU dispersions were determined by means of laser correlation spectroscopy (instrument: Malvern Zetasizer 1000, Malver Inst. Limited).

|  | Mixture 1 | Mixture 2 |
|---|---|---|
| Film-forming resin 2): | Baybond ® PU 401 | Baybond ® PU 401 |
| Fraction | 60% by weight | 77% by weight |
| Curing agent 1): | Dispersion from Example 1 (inventive) | Dispersion from Example 2 (inventive) |
| Fraction | 40% by weight | 23% by weight |
| Average particle size | 156 nm | 159 nm |
| Drying conditions | 10 min, 125° C. | 10 min, 125° C. |
| Preparation of the mixture | addition of 1) to 2); stir at room temperature for 5 min | addition of 1) to 2); stir at room temperature for 5 min |
| Tensile test: 0 value |  |  |
| 100% modulus [MPa] | 0.6 | 2.8 |
| Tensile strength [MPa] | 5.5 | 30.0 |
| Elongation at break [%] | 1 140 | 1 150 |

Analogously produced films of the mixture 1 and 2 dried at 25° C. for 24 h are highly tacky and the mechanical properties thereof cannot be measured. The film testing results shown in Table 1 showed that even at a low drying temperature of 125° C. the film undergoes crosslinking.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polyisocyanates comprising at least one of I) or ii)
   i) nonionically hydrophilicizing groups based on polyalkylene oxide polyethers containing at least 30% by weight ethylene oxide units,
   ii) ionically or potentially ionically hydrophilicizing groups which on interaction with water enter into a pH-dependent dissociation equilibrium and are therefore neutral or positively or negatively charged depending on pH,
   and
   iii) at least one structural unit of the formula (1)

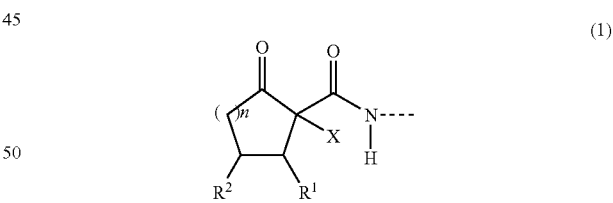

in which
X is an electron-withdrawing group,
$R^1$, $R^2$ independently of one another are a hydrogen atom, a saturated or unsaturated aliphatic or cycloaliphatic radical or an optionally substituted aromatic or araliphatic radical and each contain up to 12 carbon atoms and
n is an integer from 0 to 5.

2. The polyisocyanates according to claim 1, wherein the electron-withdrawing group X is an ester, sulphoxide, sulphone, nitro, phosphonate, nitrile, isonitrile or carbonyl group.

3. A process for preparing the polyisocyanates according to claim 1, comprising reacting A) one or more organic polyisocyanates together with
B) one or more organic compounds having at least one isocyanate-reactive group which have
   b1) nonionically hydrophilicizing groups based on polyalkylene oxide polyethers containing at least 30% by weight ethylene oxide units,
   and/or
   b2) ionically or potentially ionically hydrophilicizing groups which on interaction with water enter into a pH-dependent dissociation equilibrium and are therefore neutral or positively or negatively charged depending on pH,
C) one or more blocking agents comprising at least one OH-acidic cyclic ketone of the general formula (2),

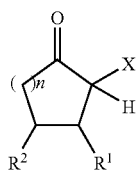

(2)

in which
X is an electron-withdrawing group,
$R^1$, $R^2$ independently of one another are a hydrogen atom, a saturated or unsaturated aliphatic or cycloaliphatic radical or an optionally substituted aromatic or araliphatic radical and each contain up to 12 carbon atoms and
n is an integer from 0 to 5,
and
D) optionally one or more (cyclo)aliphatic monoamines and/or polyamines having 1 to 4 amino groups of the molecular weight range up to 400, and optionally one or more polyhydric alcohols having 1 to 4 hydroxyl groups of the molecular weight range up to 400, optionally also amino alcohols,
in the presence of
E) one or more catalysts,
F) optionally, auxiliaries and additives and
G) optionally, solvents.

4. A method for producing coating materials, coatings, sizes, adhesives and mouldings comprising adding the polyisocyanate of claim 1 to a composition comprising a film-forming resin.

5. Aqueous solutions or dispersions of polyisocyanates according to claim 1 or 2.

6. Coating compositions comprising
   a) one or more polyisocyanates according to claim 1,
   b) one or more film-forming resins,
   c) optionally, catalysts,
   d) optionally, solvents and
   e) optionally, auxiliaries and additives.

7. Coatings obtained from coating compositions according to claim 6.

8. Substrates coated with coatings according to claim 7.

9. The process of claim 3, wherein the polyisocyanates in A) are selected from the group consisting of 1,4-diisocyanatobutane, 1,5-diisocyanatopentane, 1,6-diisocyanatohexane, 2-methyl-1,5-diisocyanatopentane, 1,5-diisocyanato-2,2-dimethylpentane, 2,2,4-trimethyl-1,6-diisocyanatohexane, 2,4,4-trimethyl-1,6-diisocyanatohexane, 1,10-diisocyanatodecane, 1,3-diisocyanatocyclohexane, 1,4-diisocyanatocyclohexane, 1,3-bis-(isocyanatomethyl)cyclohexane, 1,4-bis-(isocyanatomethyl)cyclohexane, isophorone diisocyanate, 4,4'-diisocyanato-dicyclohexylmethane, triisocyanatononane, ω,ω'-diisocyanato-1,3-dimethyl-cyclohexane, 1-isocyanato-1-methyl-3-isocyanatomethyl-cyclohexane, 1-isocyanato-1-methyl-4-isocyanatomethyl-cyclohexane, bis-(isocyanato-methyl)norbornane, 1,5-naphthalene diisocyanate, 1,3-bis-(2-isocyanatoprop-2-yl)benzene, 1,4-bis-(2-isocyanatoprop-2-yl)benzene, 2,4-diisocyanatotoluene, 2,6-diiso-cyanatotoluene, 2,4'-diisocyanatodiphenylmethane, 4,4'-diisocyanato-diphenylmethane, 1,5-diisocyanatonaphthalene, 1,3-bis(isocyanatomethyl)benzene and mixtures thereof.

10. The process of claim 3, wherein the CH-acidic cyclic ketone of the general formula (2) is selected from the group consisting of cyclopentanone-2-carboxy-methyl ester, cyclopentanone-2-carboxyethyl ester, cyclopentanone-2-carbonitrile, cyclohexanone-2-carboxymethyl ester, cyclohexanone-2-carboxyethyl ester, and cyclopentanone-2-carbonylmethane.

11. The process of claim 3, wherein the catalysts are selected from the group consisting of sodium carbonate, trisodium phosphate, 1,4-diazabicyclo [2.2.2]octane, potassium carbonate, zinc 2-ethylhexanonate, and mixtures thereof.

12. The coating composition according to claim 6, wherein the film-forming resins b) are selected from the group consisting of epoxy functional polyester polymers, polyurethanes, acrylic polymers, vinyl polymers, polyurethane dispersions, polyacrylate dispersions, polyurethane-polyacrylate hybrid dispersions, polyvinyl ether dispersions, polyvinyl ester dispersions, polystyrene dispersions, polyacrylonitrile dispersions, and mixtures thereof.

* * * * *